(12) United States Patent
Maida et al.

(10) Patent No.: US 8,797,975 B2
(45) Date of Patent: Aug. 5, 2014

(54) SCRAMBLING CODE SELECTION

(75) Inventors: Aminu Wada Maida, Swindon (GB);
Alan Carter, Swindon (GB); Stephen Whittaker, Berkshire (GB)

(73) Assignee: Ubiquisys Limited, Swindon (GB)

( * ) Notice: Subject to any disclaimer, the term of this patent is extended or adjusted under 35 U.S.C. 154(b) by 555 days.

(21) Appl. No.: 12/937,130

(22) PCT Filed: Jun. 26, 2009

(86) PCT No.: PCT/GB2009/050746
§ 371 (c)(1),
(2), (4) Date: Oct. 8, 2010

(87) PCT Pub. No.: WO2009/156765
PCT Pub. Date: Dec. 30, 2009

(65) Prior Publication Data
US 2011/0081915 A1    Apr. 7, 2011

(30) Foreign Application Priority Data

Jun. 27, 2008   (GB) .................................. 0811849.9

(51) Int. Cl.
*H04B 1/26*   (2006.01)

(52) U.S. Cl.
USPC ........ 370/329; 370/328; 370/310; 370/310.2; 455/450; 455/464; 455/455

(58) Field of Classification Search
None
See application file for complete search history.

(56) References Cited

U.S. PATENT DOCUMENTS

| | | | |
|---|---|---|---|
| 2005/0148349 A1* | 7/2005 | Putcha et al. | 455/458 |
| 2005/0153700 A1 | 7/2005 | Farnsworth et al. | |
| 2007/0097939 A1 | 5/2007 | Nylander et al. | |
| 2007/0147616 A1* | 6/2007 | Hamalainen et al. | 380/270 |
| 2008/0039141 A1 | 2/2008 | Claussen et al. | |
| 2008/0102794 A1* | 5/2008 | Keevill et al. | 455/411 |
| 2008/0214212 A1* | 9/2008 | Pridmore et al. | 455/456.5 |

FOREIGN PATENT DOCUMENTS

| | | |
|---|---|---|
| CN | 101166361 | 4/2008 |
| EP | 0 851 611 | 7/1998 |
| EP | 0851611 | 7/1998 |
| EP | 1311135 | 5/2003 |

(Continued)

OTHER PUBLICATIONS

PCT International Search Report and Written Opinion dated Sep. 23, 2009 issued in PCT/GB2009/050746.

(Continued)

*Primary Examiner* — Anez Ebrahim
(74) *Attorney, Agent, or Firm* — Weaver Austin Villeneuve & Sampson LLP

(57) ABSTRACT

In a femtocell basestation of a cellular communications network, there is a potential difficulty that the basestation may be unable to select a scrambling code for its transmissions, without the risk of interference with other basestations using the same scrambling code. The femtocell basestation receives from a management system a list comprising at least one allowed scrambling code for femtocell basestations, and also detects, in information broadcast by at least one macrocell basestation, at least one allowed scrambling code available in an area containing the basestation. If it is determined that use of each scrambling code that is allowed and is available in an area containing the basestation would cause interference with another femtocell basestation, a parameter is set to ensure that a user equipment would perform a location update when moving between the coverage areas of said basestation and the other femtocell basestation. The parameter may be a MIB and/or SIB value tag.

5 Claims, 2 Drawing Sheets

(56) References Cited

FOREIGN PATENT DOCUMENTS

| | | |
|---|---|---|
| EP | 1530311 | 5/2005 |
| EP | 1 530 311 | 11/2005 |
| EP | 1 843 618 | 10/2007 |
| FR | 2 907 290 | 10/2006 |
| FR | 2 907 290 | 4/2008 |
| GB | 2 447 439 | 9/2006 |
| WO | WO2007/015066 | 2/2007 |
| WO | WO 2007/103062 | 9/2007 |
| WO | WO 2008/051124 | 5/2008 |
| WO | 2009/156765 | 12/2009 |

OTHER PUBLICATIONS

UK Intellectual Property Office Search Report dated Oct. 7, 2008 issued in GB0811849.9.

European Examination Report for Application No. GB0811849.9 mailed Jan. 17, 2012.

CN Office Action dated Jan. 15, 2013, CN Application No. 2009801184512.

GB Search Report dated Feb. 6, 2009, GB Application No. 0811849.9.

JP Office Action dated Jul. 12, 2013, JP Application No. 2011-515628.

* cited by examiner

SCRAMBLING CODE SELECTION

CROSS-REFERENCE TO RELATED APPLICATIONS

This application is a national stage filing under 35 U.S.C. 371 of International Application PCT/GB2009/050746, filed on Jun. 26, 2009, which claims priority from GB Application No. 0811849.9, filed Jun. 27, 2008. Each of these applications is incorporated herein by reference in its entirety and for all purposes.

This invention relates to a cellular communication system, and in particular to a cellular basestation and a method of operation thereof, and more specifically to a method of obtaining a suitable scrambling code for use in the cellular basestation.

It is known to provide a cellular basestation that provides coverage for a small area, for example within a home or small office, for a relatively small number of registered users, using the existing broadband internet connection to the premises to connect in to the mobile network operator's core network. This is commonly referred to as a femtocell basestation.

WO2007/015066 discloses a self-configuring cellular basestation, which receives a permitted list of carriers and scrambling codes from a management system, and selects one of the carriers and scrambling codes on the basis of measurements made on signals received from other surrounding basestations. Specifically, WO2007/015066 discloses that the self-configuring cellular basestation should select the carrier and scrambling code that it receives with minimum received power.

In some situations, the mobile network operator may allocate only a small number of scrambling codes for use by all of the deployed femtocell basestations, and in fact it is possible that there may be only one scrambling code allocated for use by all of the femtocell basestations in an operator's network, and so there is a possibility that two femtocell basestations that are located very close together may need to use the same scrambling code.

The present invention relates to a method for reducing the possibility of interference between these femtocell basestations in this situation.

According to a first aspect of the present invention, there is provided a method of selecting a scrambling code, for use in a basestation of a cellular communications network, the method comprising:
  receiving from a management system a list comprising at least one allowed scrambling code for femtocell basestations; and
  detecting, in information broadcast by at least one macrocell basestation, at least one allowed scrambling code available in an area containing the basestation.

According to a second aspect of the present invention, there is provided a basestation for a cellular communications network, the basestation being adapted to select a scrambling code, for use in the basestation, by means of a method according to the first aspect of the invention.

According to a third aspect of the present invention, there is provided a method, for use in a basestation of a cellular communications network, the method comprising:
  identifying a desired scrambling code for use by the basestation;
  detecting an Information Block value tag broadcast by at least one other basestation using the desired scrambling code; and
  setting the value tag of a Information Block to be broadcast by the basestation, such that it differs from the or each detected value tag.

According to a fourth aspect of the present invention, there is provided a basestation for a cellular communications network, the basestation being adapted to perform the method according to the third aspect of the invention.

For a better understanding of the present invention, and to show how it may be put into effect, reference will now be made, by way of example, to the accompanying drawings, in which.

Figure 1:
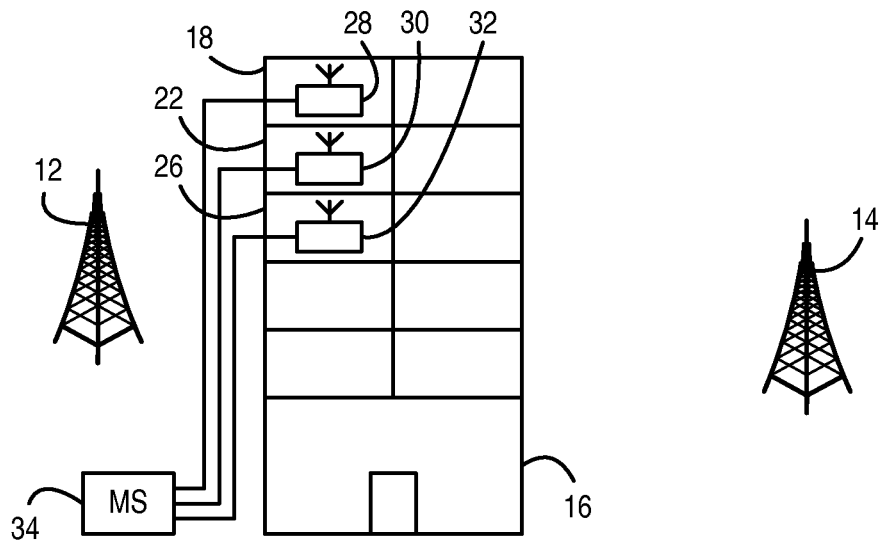
FIG. 1 is a schematic representation of a part of a cellular communications network in accordance with an aspect of the present invention.

FIG. 1 is a schematic representation of a part of a cellular communications network. The part of the network shown in FIG. 1 contains two basestations 12, 14, each of which serves a relatively wide geographical area, or cell. These relatively large cells are referred to as macrocells, and the basestations that serve macrocells are together referred to as the macrocell network. As is conventional, the basestations 12, 14 are connected in to the core network owned by the mobile network operator. As is also conventional, a user equipment within the network coverage can receive signals from, and transmit signals to, one or more of the basestations 12, 14.

Located within the coverage area of the basestation 12 is a building 16 which, in this illustrated example, is divided into apartments or small offices 18, 20, 22, 24, 26, etc. Femtocell basestations 28, 30, 32 are provided within three of these premises. The femtocell basestations 28, 30, 32 are connected in to the core network owned by the mobile network operator, using the existing broadband internet connection of that property. FIG. 1 shows the connections of each of the femtocell basestations 28, 30, 32 to a management system (MS) 34 located within the mobile operator's core network.

As is known, the femtocell basestations 28, 30, 32 can provide coverage for registered user equipments located within their coverage area. The femtocell basestations are intended to provide coverage only within their respective premises, and so they operate at low power. However, the signals transmitted by the femtocell basestations 28, 30, 32 will inevitably be detected in adjoining premises. That is, signals transmitted by the femtocell basestation 30 will be detectable not only in the relevant premises 22, but also, at reduced signal levels, in the adjoining properties 18, 24, 26 at least.

This fact has implications for the operation of the femtocell basestations 28, 30, 32. It is intended that each femtocell basestation should as far as possible be self-configuring. That is, the customer should be able to connect the femtocell basestation to the internet, and to a power supply, and the femtocell basestation should then be able to configure itself, so that it is able to begin operation, without significant user intervention.

One of the operational features of a cellular basestation, in the case of a 3G UMTS or other mobile network using Code Division Multiple Access (CDMA) to allow user equipments to communicate with the basestation, is the scrambling code used for transmissions. That is, multiple devices can transmit in the same area at the same time, and in the same frequency band, and their transmissions can still be distinguished from one another, provided that they use different scrambling codes.

Where the mobile network operator allocates a large enough number of different scrambling codes to be shared amongst the population of femtocell basestations, there is a high probability that the femtocell basestations can each select a scrambling code, and the femtocell basestations that are located close enough to each other that their transmissions could interfere with each other will be able to choose different scrambling codes.

However, where the network operator allocates only a small number of different scrambling codes to be shared amongst the population of femtocell basestations, there is a high probability that two femtocell basestations, located close enough to each other that their transmissions could interfere, will be forced to share a scrambling code.

Figure 2:
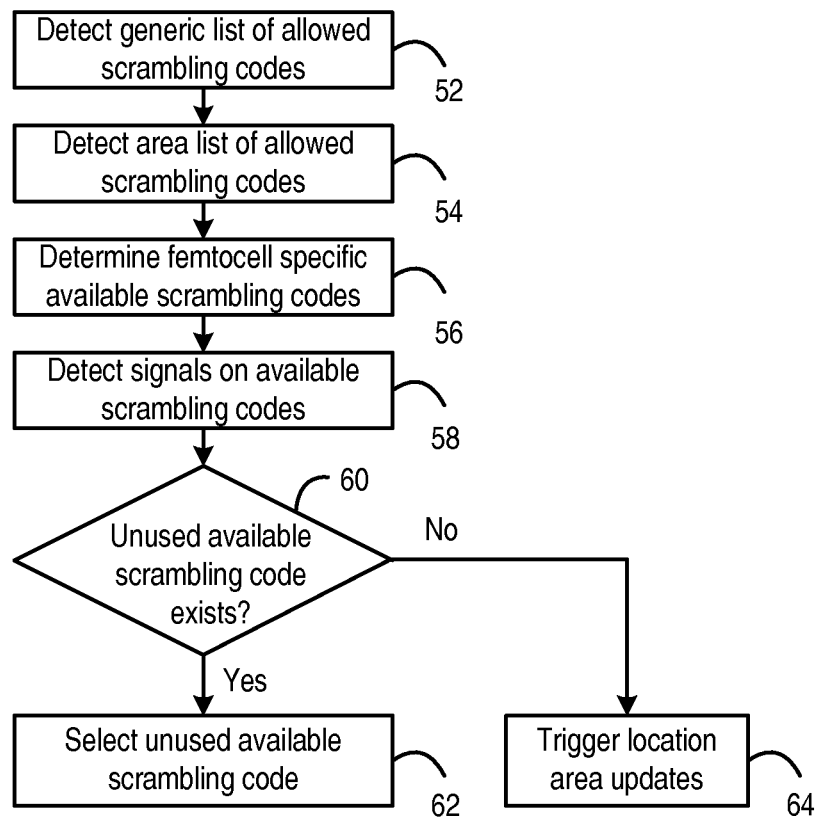
FIG. 2 is a flow chart, illustrating a first method in accordance with an aspect of the present invention.

FIG. 2 is a flow chart, illustrating a process performed on initializing a femtocell basestation, in order to detect when this latter situation occurs. The process will be described with reference to its use in the femtocell basestation 30, assuming that the femtocell basestations 28, 32 are already in operation, but it will be appreciated that the same process can be performed on initialization of any femtocell basestation.

In step 52, the femtocell basestation 30 receives a generic list of allowed scrambling codes. For example, this generic list may be received from the management system 34 of the mobile operator's core network. This generic list may contain any number of allowed scrambling codes, but the process described herein is more likely to be of use where the number of allowed scrambling codes is small, for example three or fewer.

In step 54, the femtocell basestation 30 determines the allowed scrambling codes in its area. For example, the femtocell basestation 30 may determine this list from the signals transmitted by neighbouring macrocell basestations. Each femtocell basestation can operate in terminal mode. That is, it can detect signals transmitted by other basestations on the system downlink frequencies. In particular, in this example, the femtocell basestation 30 can detect signals transmitted by the macrocell basestations 12, 14. Amongst the signals transmitted by the macrocell basestations 12, 14 are their intra-frequency and inter-frequency neighbour cell lists, which are primarily intended to be detected by user equipments in the respective coverage areas, so that they can make measurements that will be useful in determining whether a handover is required.

However, the macrocell basestation also identifies the carriers and scrambling codes that can be used by femtocell basestations within its coverage area, and the femtocell basestation can detect these signals, and can thus determine the scrambling codes that are allowed in that area from the information transmitted in the neighbour cell lists.

In step 56, the femtocell basestation 30 compares the generic list of allowed scrambling codes and the scrambling codes allowed in its area, in order to determine the femtocell specific scrambling codes that are allowed in its area.

In step 58, the femtocell basestation 30, in terminal mode as described above, detects signals transmitted on these allowed femtocell specific scrambling codes.

In step 60, it is determined whether one of these allowed femtocell specific scrambling codes is currently unused, at least within the range which is likely to give rise to interference problems. For example, the femtocell basestation 30 may simply detect the Received Signal Code Power (RSCP) level on each of the allowed femtocell specific scrambling codes. If the RSCP level on one or more of the scrambling codes is below a threshold value, the process passes to step 62, and an algorithm is performed to select one of the unused scrambling codes (if there is more than one unused scrambling code). If the RSCP level on every one of the scrambling codes is above a threshold value, the process passes to step 64, in which steps are taken to trigger location area updates when a user equipment detects multiple cells with the same scrambling code.

Figure 3:
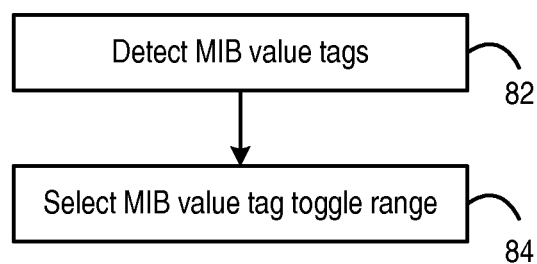
FIG. 3 is a flow chart, illustrating a second method in accordance with an aspect of the present invention.

FIG. 3 shows in more detail the process shown as step 64 in FIG. 2.

If only a small number of scrambling codes are available for use by femtocells in an area, there is a high probability that two femtocell basestations with adjacent or overlapping coverage areas will be using the same scrambling code. This can lead to a situation where calls are not completed correctly. According to the 3GPP standard, each basestation in the cellular network broadcasts a System Information Message on the broadcast control channel (BCCH). The System Information Message consists of a Master Information Block (MIB) and several System Information Blocks (SIBs). A user equipment (UE) can then obtain the required information about the basestation by decoding the SIBs. However, in order to extend battery life, by avoiding unnecessary decoding operations, many SIBs have a value tag associated with them. When a UE returns to a cell, and the value tag has not changed, it can assume that the SIB is unchanged, and hence it can avoid decoding the whole SIB.

However, where two adjacent or overlapping cells use the same carrier and the same scrambling code, this can lead to a problem. Specifically, a UE moving from one cell to another can read the SIB value tag, and, if these SIB value tags happen to take the same value in the two cells, it may then erroneously conclude that it is not necessary to decode the whole SIB. In this case, the UE would move from a first cell to a second cell, but would not complete the required location update. In the case of a mobile terminated call, the failure to complete the location update would mean that the paging message would be transmitted in the first cell, where the UE would be unable to detect it. In the case of a mobile originated call, the call would be received by the second cell and not the first cell, but the second cell would not complete the call because it would not recognize the UE.

FIG. 3 therefore illustrates a procedure that can be performed by a basestation in order to ensure that a UE will perform a location update, even when moving between two cells that are served by femtocell basestations sharing a single scrambling code.

As mentioned above, only one scrambling code may be available, and it may be in use by a nearby femtocell. In other situations, more than one scrambling code may be available, but they may all be in use by nearby femtocells. In that case, the femtocell basestation 30 selects one of these scrambling codes. Then, in step 82 of the process, the femtocell basestation 30, in terminal mode as described above, detects signals transmitted on the only allowed femtocell specific scrambling code, or on the selected scrambling code. Specifically, the femtocell basestation 30 decodes the MIB value tags broadcast by the other femtocell basestations that are using the same scrambling code.

The MIB value tag may only be able to take values in the range of 1 . . . 8, and typically toggles between two values within that range, when the system information changes. Thus, the MIB value tag may toggle between 1 and 2, or between 3 and 4, or between 5 and 6, or between 7 and 8.

In step 84, the femtocell basestation 30 sets its own MIB value tag toggling range, based on the decoded MIB value tags broadcast by the other femtocell basestations that are using the same scrambling code. Specifically, it sets its own MIB value tag toggling range such that this differs from all of the decoded MIB value tags broadcast by the other femtocell basestations that are using the same scrambling code.

This has the result that, when a UE moves from the coverage area of one femtocell basestation to another femtocell basestation, it will detect a different MIB value tag, and hence will perform a location update, even if the two femtocells are using the same scrambling code.

Setting the MIB value tag range effectively increases the number of femtocell basestations that can share a scrambling code, while avoiding the problem that the UE will not perform a location update when moving from one cell to another.

A similar effect may be achievable by setting an appropriate SIB value tag to a suitable value, or range of values

The invention claimed is:

1. A method of selecting a scrambling code, for use in a femtocell basestation of a cellular communications network, the method comprising:
   receiving from a management system a list comprising at least one allowed scrambling code for femtocell basestations;
   detecting, in information broadcast by at least one macrocell basestation, at least one allowed scrambling code available in an area containing the basestation;
   determining whether use of at least one scrambling code that is allowed and is available in an area containing the femtocell basestation would cause interference with a respective at least one other femtocell basestation; and
   if it is determined that use of each scrambling code that is allowed and is available in the area containing the femtocell basestation would cause interference with a respective at least one other femtocell basestation,
      selecting a scrambling code which would cause interference with another femtocell basestation; and
      setting a broadcast parameter to ensure that a user equipment would perform a location update when moving between the coverage areas of said femtocell basestation and the other femtocell basestation, wherein the step of setting the broadcast parameter comprises setting a value tag of a broadcast Information Block which is different to an equivalent value tag of a broadcast Information Block used by the other basestation.

2. A method as claimed in claim 1, further comprising:
   if it is determined that there is more than one scrambling code that is allowed and is available in an area containing the basestation, whose use would not cause interference with a respective at least one other femtocell basestation,
   selecting one of said scrambling codes for use by said basestation.

3. A method as claimed in claim 1, wherein the step of setting the value tag of the broadcast Information Block comprises setting a value tag of a Master Information Block.

4. A method as claimed in claim 1, comprising detecting value tags broadcast by other femtocell basestations using a desired scrambling code, and setting the value tag of a broadcast Information Block such that it differs from the detected value tags.

5. A femtocell basestation for a cellular communications network, the basestation being adapted to select a scrambling code, for use in the basestation, by means of a method, the method comprising:
   receiving from a management system a list comprising at least one allowed scrambling code for femtocell basestations;
   detecting, in information broadcast by at least one macrocell basestation, at least one allowed scrambling code available in an area containing the basestation;
   determining whether use of at least one scrambling code that is allowed and is available in an area containing the femtocell basestation would cause interference with a respective at least one other femtocell basestation; and
   if it is determined that use of each scrambling code that is allowed and is available in the area containing the femtocell basestation would cause interference with a respective at least one other femtocell basestation,
      selecting a scrambling code which would cause interference with another femtocell basestation; and
      setting a broadcast parameter to ensure that a user equipment would perform a location update when moving between the coverage areas of said femtocell basestation and the other femtocell basestation, wherein the step of setting the broadcast parameter comprises setting a value tag of a broadcast Information Block which is different to an equivalent value tag of a broadcast Information Block used by the other basestation.

* * * * *